(12) United States Patent
Kim et al.

(10) Patent No.: US 8,559,871 B2
(45) Date of Patent: Oct. 15, 2013

(54) DUAL MODE SATELLITE VERY SMALL APERTURE TERMINAL APPARATUS AND CONTROLLING METHOD THEREOF

(75) Inventors: Pan Soo Kim, Daejeon (KR); Jae Hee Han, Daejeonl (KR); Dae Ig Chang, Daejeon (KR); Ho Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 372 days.

(21) Appl. No.: 12/973,517

(22) Filed: Dec. 20, 2010

(65) Prior Publication Data

US 2011/0151777 A1 Jun. 23, 2011

(30) Foreign Application Priority Data

Dec. 21, 2009 (KR) .................... 10-2009-0127730

(51) Int. Cl.
*H04B 7/185* (2006.01)
(52) U.S. Cl.
USPC .......... 455/13.4; 455/12.1; 455/427; 455/430; 455/3.02; 455/3.04; 725/63; 725/64; 725/67; 725/68; 725/72
(58) Field of Classification Search
USPC ............. 455/13.4, 12.1, 427, 430, 3.02, 3.04, 455/3.05, 3.06, 422.1, 403, 575.1, 550.1, 455/522.1, 69, 127.1, 572, 575.7; 725/63, 725/64, 67–69, 72
See application file for complete search history.

(56) References Cited

U.S. PATENT DOCUMENTS

| 6,181,920 | B1 * | 1/2001 | Dent et al. ................ 455/101 |
| 6,934,512 | B2 | 8/2005 | Meirzon et al. |
| 7,207,054 | B1 * | 4/2007 | Richards et al. ............. 725/72 |
| 2010/0071009 | A1 * | 3/2010 | Xiu et al. ..................... 725/64 |

FOREIGN PATENT DOCUMENTS

KR 10-2006-0059640 A 6/2006

* cited by examiner

*Primary Examiner* — Keith Ferguson
(74) *Attorney, Agent, or Firm* — Rabin & Berdo, P.C.

(57) ABSTRACT

Provided are a satellite VSAT apparatus and a control method thereof. The satellite VSAT apparatus according to an exemplary embodiment of the present invention can switch a modulation type of a signal to be transmitted from an indoor unit (IDU) to the outdoor unit to a linear or non-linear type in a case in which outputting of a transmitted signal is not controlled to an outdoor unit due to limitations, that is, there is no function such as an automatic signal level control in a block up-converter (BUC), a case in which transmission output limitation is large due to a lot of interference requirements for an adjacent channel, a case in which the number of adjacent channels (carriers) is large, or a case in which adjacent channel interference is large due to a frequency in a satellite multi-beam environment and polarization reuse, in a satellite VSAT apparatus system which aims at a low-priced user terminal.

20 Claims, 1 Drawing Sheet

DUAL MODE SATELLITE VERY SMALL APERTURE TERMINAL APPARATUS AND CONTROLLING METHOD THEREOF

CROSS-REFERENCE TO RELATED APPLICATIONS

This application claims priority under 35 U.S.C. §119 to Korean Patent Application No. 10-2009-0127730, filed on Dec. 21, 2009, in the Korean Intellectual Property Office, the disclosure of which is incorporated herein by reference in its entirety.

TECHNICAL FIELD

The present invention relates to a satellite very small aperture terminal apparatus and a controlling method thereof, and more particularly, to a terminal transmission technology adopting a dual mode modulation type for a future-generation satellite VSAT system.

BACKGROUND

Satellite very small aperture terminals (VSATs) transmit packet data in a time division multiple access (TDMA) type. The satellite VSATs control a signal level at the time of transmitting the packet data. In spite of minute control, the signal level control has a direct influence on baseband performance, that is, transmission performance.

Meanwhile, when the satellite VSATs receive continuous stream data such as satellite broadcasts, they can easily control the signal level. However, when the satellite VSATs receive burst data, the satellite VSATs detect power through automatic level control (ALC) to control the signal level. In this case, inaccuracy in power detection and power loss by a cable and the like also influence the transmission performance of the satellite VSAT.

As such, when the power level is not accurately controlled, the satellite VSATs should consider adjacent channel interference, a problem in that a solid state power amplifier (SSPA) operates in a non-linear section, and the like. Therefore, the satellite VSATs require a lot of back off at the time of transmitting the packet data. If the back off of the transmission power is not a lot, it influences the interference of the adjacent channel Moreover, when the same/adjacent channel interference occurs even in a multi-beam satellite repeater, polarization reuse, and the like in addition to a single-beam satellite repeater, power is not balanced, thus causing interference.

In particular, when the satellite VSATs operate in a linear modulation type, the above-mentioned influence is exerted to the transmission performance. Contrary to this, techniques such as frequency shift keying (FSK), minimum shift keying (MSK), and continuous phase modulation (CPM) as the non-linear modulation type are not better than the linear modulation type in transmission efficiency per bandwidth, but less influence the adjacent channel interference. That is, although imbalance in power with the adjacent channel occurs, the interference influence decreases.

Meanwhile, the transmission performance and price of the satellite VSATs are influenced depending on an outdoor unit (ODU). Further, the outdoor unit (ODU) is significantly influenced by temperature, surrounding conditions, part price, an antenna installation location, and the like.

Therefore, it is difficult for a private person to purchase and install the satellite VSAT in person and is problematic in that maintenance for the satellite VSAT should be performed at the time of changing his/her residence. Further, when maintenance is not performed, a subscriber is in an outage state in terms of a network.

SUMMARY

An exemplary embodiment of the present invention provides a satellite VSAT apparatus that includes: an indoor unit (IDU) switching a modulation type to a linear or non-linear type in accordance with a control signal; and a controller outputting the control signal depending on the operational performance of an outdoor unit (ODU).

Another exemplary embodiment of the present invention provides a controlling method of a satellite VSAT apparatus including an outdoor unit (ODU) and an indoor unit (IDU), which includes: switching a modulation type of the indoor unit (IDU) to a linear or non-linear type in accordance with a control signal; and outputting the control signal depending on the operational performance of the outdoor unit (ODU).

Other features and aspects will be apparent from the following detailed description, the drawings, and the claims.

DETAILED DESCRIPTION OF EMBODIMENTS

Figure 1:
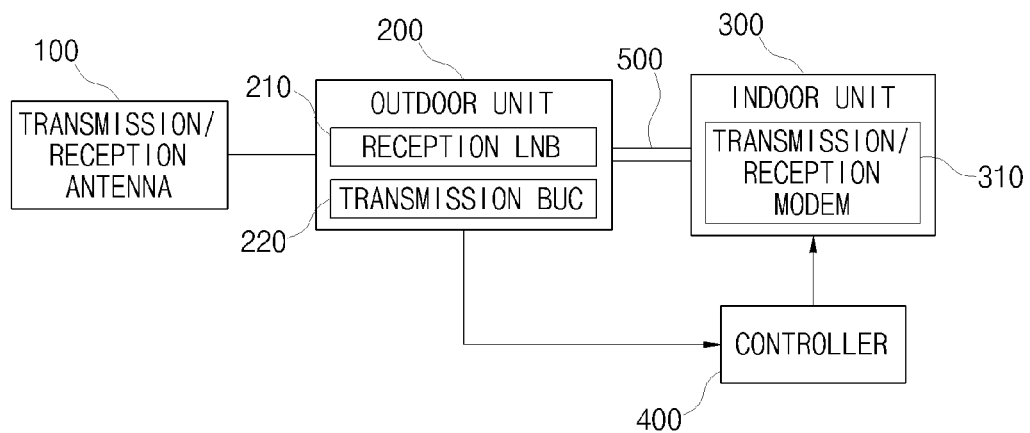
FIG. 1 is a block diagram of a satellite VSAT apparatus according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, referring to FIGS. 1 and 2, a satellite VSAT apparatus according to an exemplary embodiment of the present invention will be described. FIG. 1 is a block diagram of a satellite VSAT apparatus according to an exemplary embodiment of the present invention and FIG. 2 is an exemplary diagram of the satellite VSAT apparatus according to an exemplary embodiment of the present invention.

As shown in FIG. 1, the satellite VSAT apparatus according to the exemplary embodiment of the present invention includes a transmission/reception antenna 100, an outdoor unit (ODU) 200, an indoor unit (IDU) 300, and a controller 400.

Figure 2:
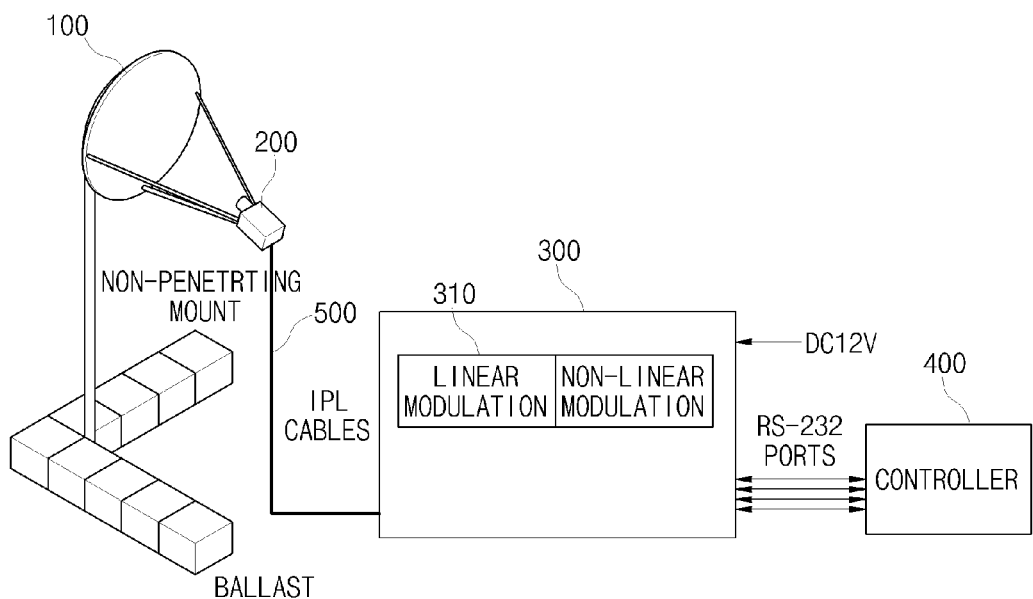
FIG. 2 is an exemplary diagram of the satellite VSAT apparatus according to an exemplary embodiment of the present invention.

The transmission/reception antenna 100 may be installed as shown in FIG. 2, and receives a signal from the outside and transmits the received signal to the outdoor unit 200 and receives the signal from the outdoor unit 200 and transmits the received signal to the outside.

The outdoor unit 200 includes a reception low noise block (LNB) down converter 210 and a transmission frequency block up converter (BUC) 220.

The reception low-noise block down converter 210 converts and amplifies a signal of a super high frequency (SHF) band (3.5 to 30 GHz) including a Ku/Ka/C band which is received from the transmission/reception antenna 100 to an intermediate frequency (IF signal) of 1 GHz.

The transmission frequency block up-converter 220 up-converts a frequency of a low-frequency signal and outputs the low-frequency signal as a high-frequency signal.

The outdoor unit 200 influences the transmission performance of the satellite VSAT apparatus in accordance with temperature, surrounding conditions (environment), prices of parts, that is, the reception low-noise block down converter 210, the transmission frequency block-up converter 220, and the like, an installation location of the transmission/reception antenna 100, and the like.

For example, when the outdoor unit 200 is influenced by the temperature, the surrounding conditions, the prices of the parts, the installation location of the transmission/reception antenna 100, and the like, the satellite VSAT apparatus has transmission performance which may be deteriorated enough not to access a satellite link Further, in a case in which the outdoor unit 200 cannot control accurate transmission output power, that is, cannot accurately detect signal power, it is difficult for to purchase and install the satellite VSAT apparatus in person, or the satellite VSAT apparatus should be maintained due to removal, and the like, interference is exerted to adjacent channels to cause the transmission performance of the satellite VSAT apparatus to be deteriorated. Therefore, in this case, the satellite VSAT apparatus inputs a signal which is modulated in a non-linear modulation type to access the satellite link into the outdoor unit 200.

However, in a case in which installation and operation environments of the satellite VSAT apparatus are similar to actual environments, the transmission output power can be controlled in the outdoor unit 200, that is, signal intensity is accurately detected, maintenance is possible, or the like, the transmission performance of the satellite VSAT apparatus is not deteriorated. As a result, the satellite VSAT apparatus inputs a signal modulated in a linear modulation type such as phase shift keying (PSK) into the outdoor unit 200.

The indoor unit 300 includes a transmission/reception modem 310.

The indoor unit 300 supports a dual mode transmission technology so that the satellite VSAT apparatus shows optimal transmission performance in accordance with an influence of the outdoor unit 200. For example, the indoor unit 300 switches the modulation type to a linear or non-linear type in accordance with control of the controller 400. That is, the indoor unit 300 switches a modulation type of a signal inputted into a transmission terminal, i.e., the outdoor unit 200 in the transmission/reception modem 310 to the liner or non-linear type in accordance with a control signal.

Herein, the dual mode transmission technology represents a technology which modulates the signal to the linear modulation type and the non-linear modulation type and transmits the modulated signal. The linear modulation type includes BPSK, QPSK, 8PSK, and 16APSK (16QAM) and the non-linear modulation type includes MSK, 4/8CPM, FSK, and the like.

The outdoor unit 200 and the indoor unit 300 are connected through a cable 500. For example, the cable 500 may be an intra-facility link (IFL) cable for intermediate frequency transmission and as the cable 500 is lengthened, and the signal intensity decreases, thereby increasing transmission loss.

The controller 400 outputs the control signal in accordance with at least one of the temperature, the surrounding conditions, the part price, and the installation location of the transmission/reception antenna 100 of the outdoor unit 200.

For example, the controller 400 outputs a control signal for switching the modulation type of the signal inputted into the transmission terminal to the linear type in the case in which the part price of the outdoor unit 200 is high. That is, the controller 400 outputs the control signal for switching the modulation type to the linear modulation type because the number of factors deteriorating the transmission performance decreases even though the signal modulated in the linear modulation type is inputted into the outdoor unit 200 in the case in which the transmission frequency block up-converter 220 is high-priced, for example, a local oscillator (LO) is not a low-priced model of a phase locked type.

When an automatic level control (ALC) device is installed in the outdoor unit 200 and a power level is measured through the ALC device, the controller 400 set a predetermined threshold range on the basis of the measured power level to allow a solid state power amplifier (SSPA) to operate within the set threshold range.

The controller 400 outputs the control signal for switching the modulation type to the linear type when the outdoor unit 200 accurately detects the power level within the set predetermined threshold range.

The controller 400 outputs a control signal for switching the modulation type to the non-linear type in at least one of a case in which the part price of the outdoor unit 200 is low, a case in which the loss of the cable 500 connecting the outdoor unit 200 and the indoor unit 300 to each other is larger than a predetermined loss value, that is, transmission loss is large not to access the satellite link by the cable 500, a case in which a signal level of at least one of transmitted and received signals is different from a level measured in initial installation, and a case in which a communication failure (outage) from a network occurs in the outdoor unit 200.

By this configuration, when the satellite VSAT apparatus does not access the satellite by the outdoor unit 200, it may access the satellite by switching the modulation type of the indoor unit 300. Further, since the satellite VSAT apparatus may switch the modulation type of the indoor unit 300, it may access the satellite without maintenance and may operate optimally in accordance with an environment of the outdoor unit 200 and a satellite link environment.

Meanwhile, a linear modulation type signal bandwidth and a non-linear modulation type signal bandwidth coincide with each other. In this case, the linear modulation type and non-linear modulation type signal bandwidths may coincide with each other by setting at least one of data rate, code rate, and a pulse shaping filter coefficient of the satellite VSAT apparatus in advance.

According to the exemplary embodiments of the present invention, when satellite access is limited by an outdoor unit, an indoor unit technology which is optimally operable depending on an outdoor unit environment and a satellite link environment in a satellite VSAT is provided by accessing a satellite through switching a modulation method of an indoor unit and a private subscriber can always access a network even though maintenance by a service operator is not performed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A satellite very small aperture terminals (VSAT) apparatus, comprising:
    an indoor unit (IDU) configured to perform both linear and non-linear modulations, and to selectively perform one of the linear and non-linear modulations on a signal in accordance with a control signal; and
    a controller outputting the control signal depending on an operational performance and a transmission power output control function of an outdoor unit (ODU).

2. The apparatus of claim 1, wherein the indoor unit includes a transmission/reception modem and switches a modulation type inputted into a transmission terminal of the transmission/reception modem to the linear or non-linear type in accordance with the control signal.

3. The apparatus of claim 1, wherein the controller outputs the control signal for switching the modulation type to the linear type when the operational performance of the outdoor unit (ODU) is equal to or higher than a predetermined level.

4. The apparatus of claim 3, wherein the operational performance of the outdoor unit (ODU) is influenced by at least one of temperature, surrounding conditions, the prices of parts, an installation location of an antenna.

5. The apparatus of claim 1, wherein when an automatic level control (ALC) device is installed in the outdoor unit and a power level is measured by the ALC device, the controller sets a predetermined threshold range on the basis of the measured power level to allow a solid state power amplifier (SSPA) to operate within the threshold range.

6. The apparatus of claim 5, wherein the controller outputs the control signal for switching the modulation type to the linear type when the power level is accurately detected in the outdoor unit (ODU).

7. The apparatus of claim 1, wherein the controller outputs a control signal for switching the modulation type to the non-linear type in at least one of a case in which a lowpriced part is mounted on the outdoor unit, a case in which the loss of a cable connecting the outdoor unit and the indoor unit to each other is larger than a predetermined loss value, a case in which a signal level of at least one of transmitted and received signals is different from a level measured in initial installation, and a case in which a communication failure (outage) from a network occurs in the outdoor unit.

8. The apparatus of claim 7, wherein the low-priced part is a transmission frequency block up-converter (BUC) including a free running oscillator and a local oscillator (LO) which is phase locked.

9. The apparatus of claim 1, wherein a signal bandwidth of the linear modulation type and a signal bandwidth of the non-linear modulation type coincide with each other.

10. The apparatus of claim 9, wherein the signal bandwidths of the linear modulation type and the non-linear modulation type coincide with each other by setting at least one of data rate, code rate, and a pulse shaping filter coefficient in advance.

11. A control method of a satellite VSAT apparatus including an outdoor unit (ODU) and an indoor unit (IDU), comprising:
    switching a modulation type of the indoor unit (IDU) to a linear or non-linear type in accordance with a control signal; and
    outputting the control signal depending on the operational performance of the outdoor unit (ODU).

12. The method of claim 11, wherein the operational performance of the outdoor unit (ODU) is influenced by at least one of temperature, surrounding conditions, the prices of parts, and an installation location of an antenna.

13. The method of claim 11, wherein the switching switches a modulation type inputted into a transmission terminal of a transmission/reception modem included in the indoor unit to the linear or non-linear type in accordance with the control signal.

14. The method of claim 11, wherein the controlling includes,
    verifying the operational performance of the outdoor unit; and
    outputting a control signal for switching the modulation type to the linear type when the operational performance is equal to or higher than a predetermined level on the basis of the verification result.

15. The method of claim 11, further comprising:
    measuring a power level through the ALC device while an automatic level control (ALC) device is installed in the outdoor unit; and
    setting a predetermined threshold range on the basis of the power level measured to operate a solid state power amplifier (SSPA) within the predetermined threshold range.

16. The method of claim 15, wherein the outputting includes outputting the control signal for switching the modulation type to the linear type when the power level is accurately detected in the outdoor unit (ODU).

17. The method of claim 11, wherein the outputting includes outputting a control signal for switching the modulation type to the non-linear type in at least one of a case in which a low-priced part is mounted on the outdoor unit, a case in which the loss of a cable connecting the indoor unit is larger than a predetermined loss value, a case in which a signal level of at least one of transmitted and received signals is different from a level measured in initial installation, and a case in which a communication failure (outage) from a network occurs in the outdoor unit.

18. The method of claim 17, wherein the low-priced part is a transmission frequency block-up converter (BUC) including a free running oscillator and a phased locked local oscillator (LO).

19. The method of claim 11, wherein a signal bandwidth in the linear modulation type coincides with a signal bandwidth in the non-linear modulation type.

20. The method of claim 19, wherein the signal bandwidths in the linear modulation type and the non-linear modulation type coincide with each other by setting at least one of data rate, code rate, and a pulse shaping filter coefficient in advance.

* * * * *